Patented May 12, 1936

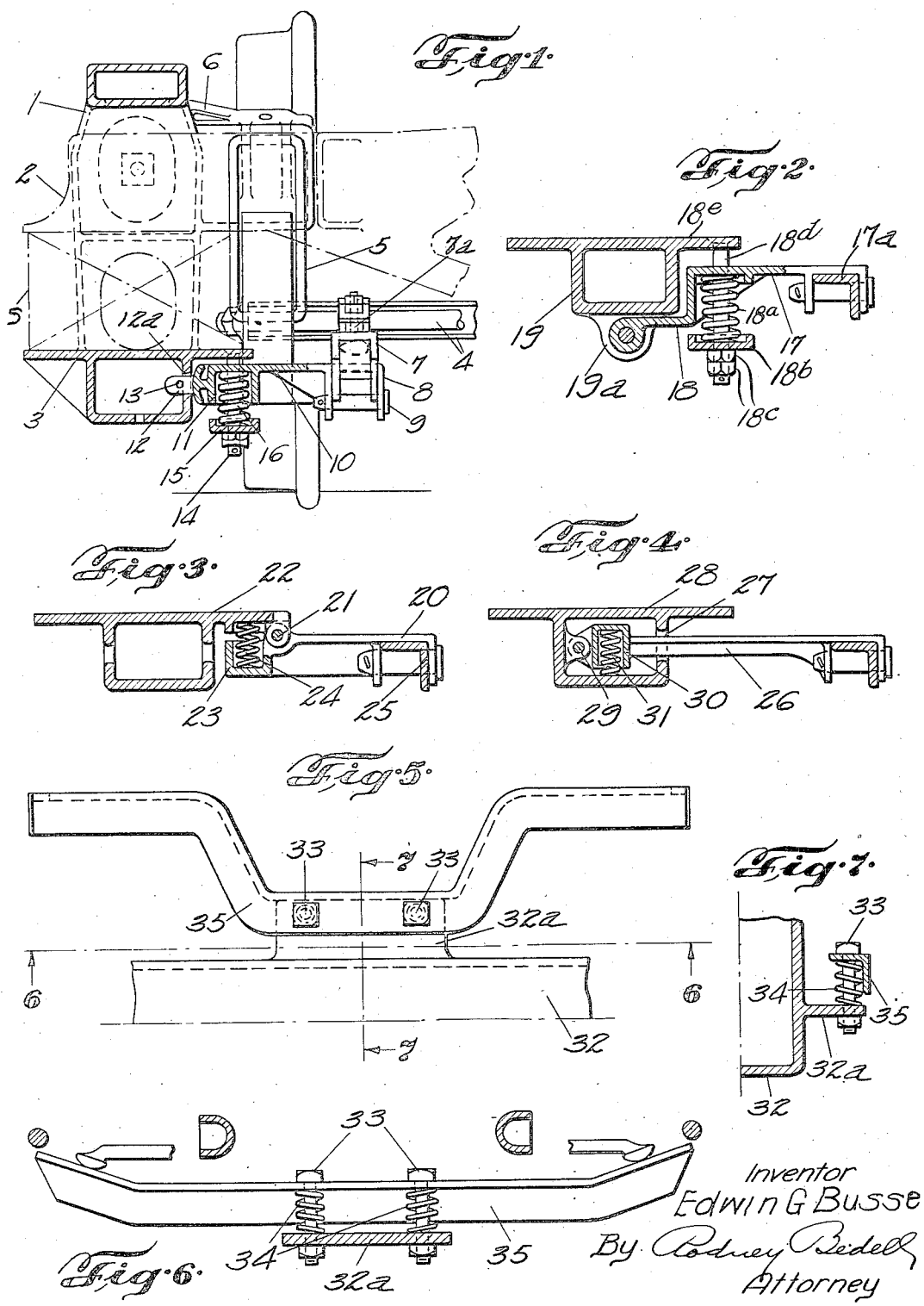

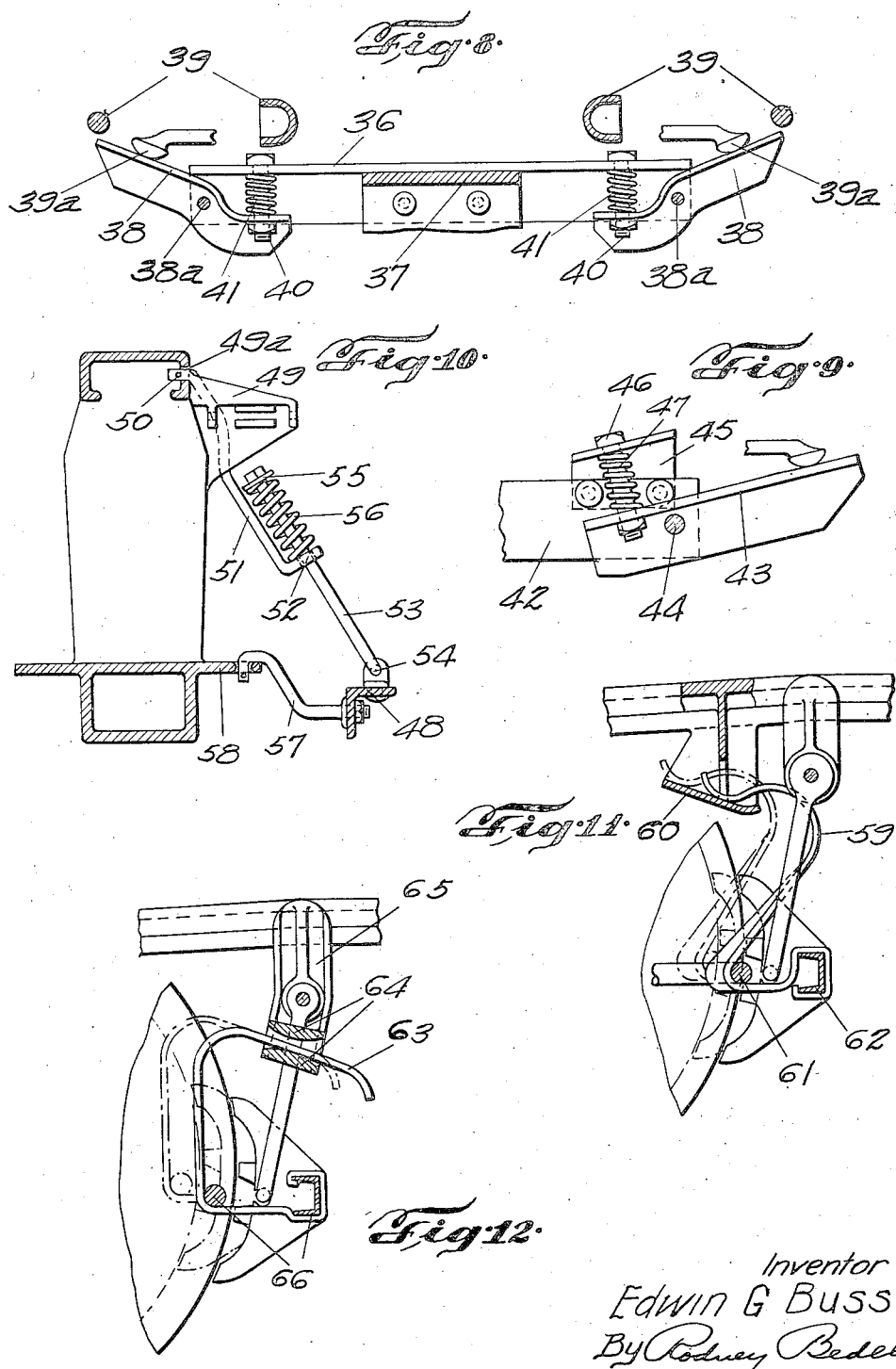

2,040,512

UNITED STATES PATENT OFFICE 2,040,512

BRAKE BEAM SUPPORT

Edwin G. Busse, Chicago, Ill., assignor to Chicago Railway Equipment Company, Chicago, Ill., a corporation of Illinois Application July 13, 1932, Serial No. 622,184

12 Claims. (Cl. 188—210)

This invention relates to railway rolling stock and consists particularly in a novel guard, guide, or support device for brake beams.

Various devices have been suggested for mounting the brake beam fourth point support or safety guard upon the truck side frame, particularly in trucks having no spring plank. In many cases, these devices have involved an arm or bracket rigid with the side frame, which arm directly carries the guarding or supporting member. However, such an arm is susceptible to being weakened by vibration of the vehicle with the consequent danger of breakage, and also it interferes with assembling and disassembling other truck parts, and in cast trucks, increases the labor and expense of molding the side frame.

The main object of the present invention is to provide a guarding or supporting device for brake beams which is yieldingly connected to the side frame in a manner to prevent destructive vibration between the supporting bracket and side frame.

Another object is to provide simplified means for mounting the guard or support on the truck side frame which does not require the provision of a long rigid supporting arm on the side frame.

These objects and others are attained substantially by the structures illustrated in the accompanying drawings in which—

Figure 1 is a partial vertical transverse section through the middle portion of a truck side frame with the invention applied thereto, the adjacent brake beam parts and beam engaging guard, guide, or support member being shown in elevation.

Figure 2 is a detail vertical section illustrating a modified form of the invention.

Figures 3 and 4 are similar sections illustrating other forms.

Figure 5 is a detail top view of another modification.

Figure 6 is a vertical longitudinal section taken on the line 6—6 of Figure 5.

Figure 7 is a vertical transverse section taken on the line 7—7 of Figure 5.

Figure 8 illustrates another form of the invention.

Figure 9 is a detail of a form somewhat similar to that in Figure 8.

Figure 10 is a detail vertical transverse section through a truck frame and illustrating a different form of the invention.

Figures 11 and 12 are vertical longitudinal sectional views illustrating still other forms of the invention.

In Figure 1, the invention is applied to a truck including a side frame 1, having the usual central opening for the bolster 2, and a spring seat 3 for mounting the bolster supporting springs indicated at S. Brake beam 4 is carried in the usual manner by a hanger 5 at each end, the hanger in turn being supported by hanger bracket 6 projecting inwardly from the side frame above the beam.

Disposed beneath the beam is a safeguarding and supporting member 7, shown as an inverted channel, which engages the chair 7a depending from the beam. The member 7 is mounted upon a bracket 8 by means of a pin 9, the bracket having an arm 10 projecting outwardly therefrom which at its outer end has a downwardly disposed cup-like spring seat 11 and a restricted portion 12 extending through an opening 12a in the side frame beneath the spring seat 3 and secured therein by means of a pin or key 13. A bolt 14 depends from the inner portion of the spring seat 3 and carries a disc 15 and a coiled spring 16 which at its upper extremity engages the bracket arm 10 within spring seat 11. The spring 16 serves to yieldingly maintain the bracket 8 and guarding and supporting member 7 in the proper position beneath the beam. In case of failure of the hanger bolt 14 or the spring 16, the member 7 is prevented from falling to the track by engagement of restricted end 12 of the bracket arm with the edge of perforation 12a.

The form in Figure 2 functions similarly to that just described, but the bracket arm 17, carrying the angle guard or support 17a, includes an angular portion 18 at the outer end which extends downwardly along the lower portion of the side frame 19 and then beneath the same and is pivoted to a bracket 19a on the under surface of the frame 19. Bracket arm 17 is yieldingly supported by a coiled spring 18a seated on discs 18b, carried by nuts 18c on bolt 18d suspended from the spring seat ledge 18e on the side frame.

In Figure 3, the guard bracket 20 is pivoted at 21 to the inner extremity of the bolster spring seat 22 and includes an upwardly disposed cup-like spring seat 23 which carries a coiled spring 24. Spring 24 engages the under surface of the spring seat 22 outwardly of pivot 21 and yieldingly maintains the angle safety guard 25 in position.

In Figure 4, the arm 26 of the safety guard bracket extends through a perforation 27 into the hollow interior of the side frame lower chord and beneath the bolster spring seat 28 and is pivoted at 29 to the outer wall of the chord.

Arm 26 is provided with a downwardly disposed cup-like spring seat 30 which receives a coiled spring 31, the spring at its lower extremity resting upon the bottom wall of the frame.

In Figures 5, 6 and 7, the truck side frame 32 is provided with a short shelf or ledge 32a which carries vertically disposed bolts 33 and coiled springs 34 surrounding the bolts. Mounted between the bolt heads and the upper extremities of the springs 34 is a safety guard member 35 which extends inwardly of the frame at an angle and then longitudinally beneath the brake beam (not shown).

In Figure 8, a rigid longitudinal member 36 is mounted on ledge 37 projecting from the side frame and preferably extends at an angle inwardly, as member 35 in Figure 6. A bar 38 for engaging chair 39a on the beam 39 is pivoted to each end of member 36, as at 38a, and each pivoted bar is yieldingly maintained in position by means of a coiled spring 41 surrounding a bolt 40 which depends from the horizontal flange of member 36.

In Figure 9, member 42 extends inwardly from the side frame, similar to member 36 in Figure 8, and pivotally mounts bars 43 at its extremities. Projecting upwardly from the member 42 adjacent the pivot 44 is an angle 45 which carries bolt 46 and coiled spring 47 for yieldingly resisting rotation of the beam engaging bar 43.

In Figure 10, the brake beam safety guard or support 48 is illustrated as yieldingly supported from the side frame above the beam by means of a downwardly inclined device connected at its ends to the side frame and to the member 48. The device comprises a bar 51 which has its upper end secured within perforation 49a by a pin or key 50 and has a loop 52 at the bottom surrounding a rod 53 pivoted at 54 to the member 48. Rod 53 mounts a washer 55 and a coiled spring 56 which seats against the looped portion 52 of bar 51 and yieldingly resists elongation of the support device. Member 48 is maintained in position inwardly of the frame by means of a hook element 57 which is pivoted to the spring seat 58. This form is more fully described and specifically claimed in a co-pending application Serial No. 623,147, filed July 18, 1932 in the names of Herbert W. Ekholm and Edwin G. Busse.

In Figure 11, the brake beam is supported from above by means of a curved strap device 59 which slidably engages a bracket 60 on the side frame above the beam. The strap 59 includes a vertically resilient curved intermediate portion and at the lower extremity extends around the tension member 61 of the beam and is secured to the compression member 62.

In Figure 12, the support device 63 engages the beam 66 in a manner similar to that illustrated in the preceding figure, but at the upper extremity the strap 63 curves rearwardly and is slidably mounted between the jaws 64 projecting from the hanger bracket 65. The forms in Figures 11 and 12 are more fully described and specifically claimed in my co-pending application Serial No. 550,238, filed July 11, 1931.

In the last two forms described, the curved straps 59 and 63 combine the brake beam support member with the yielding element connecting the same with the truck side frame.

In each of the forms, the brake beam is preferably, but not necessarily, supported by a rigid member extending beneath the beam. This element may engage a suitable chair on the beam, or the beam itself, as illustrated in Figures 1 and 11, respectively, in which cases the member serves to guide the beam in its movement towards and away from the wheels, or the member may be spaced throughout its length beneath the beam, serving merely as a safety guard. It is obvious that in each form the safety guard or support bracket may be mounted on the frame after the truck has been assembled and with slight variation of the side frame. Moreover, relative vibration between the truck frame and bracket during operation of the vehicle will be dissipated by the vertically resilient portion of the bracket or by the resilient element connecting the bracket with the side frame. The particular point of attachment of the bracket to the side frame is not essential.

Obviously, the invention is not limited to the details of the forms shown but may be modified in various respects without departing from the spirit of the invention and exclusive use of all such modifications as come within the scope of the appended claims is contemplated.

What is claimed is:

1. In a railway truck, a side frame element, a brake beam guard, guide or support member spaced laterally a substantial distance from said element, and means yieldingly supporting said member on said element.

2. In a railway truck, a side frame element, a brake beam guard, guide or support member spaced laterally a substantial distance from said element, and vertically resilient means supporting said member from said element.

3. In a railway truck, a side frame part, a rigid guard, guide or support member at one side of said part for association with a brake beam, and vertically resilient means supporting said element from said part.

4. In a railway truck, a side frame part, a brake beam, a guard, guide, or support member disposed to underlie the brake beam, a bracket projecting sidewardly from said member, and resilient means supporting said bracket from said part.

5. In a railway truck, a side frame part, a brake beam, a rigid guard, guide or support member underlying said beam, a bracket projecting sidewardly from said member, and vertically resilient means supporting said bracket from said part.

6. In a railway truck, a side frame part, a brake beam, a guard, guide or support member underlying said beam, an arm projecting horizontally from said member and pivoted on said part, and a spring between said arm and said part and yieldingly maintaining said bracket and said member in position.

7. In a railway truck, a side frame part, a rigid guard, guide or support member disposed to underlie the brake beam, a supporting bracket projecting sidewardly from said member and having pivotal connection with said frame part, an element rigid with said part adjacent said connection, and a spring between said bracket and said element and yieldingly maintaining said bracket and said member in position.

8. In a railway truck, a side frame part including a vertically rigid element, a brake beam guard, guide or support device including a part for association with a brake beam and a portion extending upwardly therefrom, and resilient means connecting said frame element and said upwardly extending portion of said device.

9. In a railway truck, a side frame part including a horizontal member and a portion therebeneath, a brake beam guard, guide or support device including an element pivoted to said portion, and a spring between said device and said horizontal member and maintaining said device in position.

10. In a railway truck, a side frame member having a ledge and side and bottom walls, and a brake beam guard, guide or support device comprising a part for association with the brake beam, a sidewardly extending part having a shoulder opposing said side wall beneath said ledge, and a portion extending along said bottom wall and pivoted thereto, a bolt depending from said ledge and carrying a spring seat beneath said sidewardly extending part, and a coiled spring resting on said seat and engaging said part to maintain said device in position.

11. In a railway truck, a frame part including a rigid member, a spring carried by said member and a brake beam guard, guide or support device carried by said spring and offset laterally of the truck between its beam engaging portion and said member.

12. In a railway truck, a side frame part having a horizontal ledge, a spring structure resting on said ledge, and a brake beam guard, guide or support device solely supported by said spring structure and comprising a part for association with the brake beam and a portion offset laterally of the truck and resting on said springs.

EDWIN G. BUSSE.